United States Patent Office 3,556,772
Patented Jan. 19, 1971

3,556,772
METHOD OF SPONGE IRON BRIQUETTING
Hans Rausch, Oberursel, Taunus, and Hubert Viereck, Nieder, Eschbach, Germany, assignors to Metallgesellschaft Aktiengesellschaft, Frankfurt am Main, Germany
No Drawing. Filed Mar. 21, 1968, Ser. No. 714,789
Claims priority, application Germany, Mar. 29, 1967,
M 73,365
Int. Cl. C21b 13/00
U.S. Cl. 75—33     6 Claims

ABSTRACT OF THE DISCLOSURE

Sponge iron is briquetted at temperatures from 400 to 800° C. and pressures from 1,500 to 3,000 kg./cm.$^2$ to form briquettes having a bulk density of about 5 g./cm.$^3$. These briquettes are heavy enough to sink through the slag in a furnace and down into the molten steel.

---

This invention relates to a process of making sponge iron briquettes, which comprises transforming enriched iron ore concentrates consisting of green pellets, prehardened pellets or coarse-grained crushed ore lumps into sponge iron in a rotary kiln under reducing conditions and, if desired, with the aid of admixtures, and briquetting the sponge iron after the surplus reducing agent, admixture and ash have been removed.

Due to the removal of oxygen effected by the reduction, the reduced ore has a very high porosity and must be compacted to a higher bulk density for use in electric melting furnaces so that the sponge iron can penetrate the slag layer floating on the molten steel bath and can become submerged in the molten metal.

A compacting of the sponge iron is also desirable when the sponge iron is to be stored and transported for a prolonged time. Due to its high porosity, the sponge iron tends to absorb moisture in the pores so that a reoxidation of the porous material results and the sponge iron is much deteriorated before it is charged into a furnace.

It is known (Stahl und Eisen 1959, 79th Year, page 1334) to press fine-grained iron ores for use in a blast furnace with the aid of binders, such as bitumen, spent sulphite liquor, cement, and admixtures, under applied pressures of 750 to 3,000 kg./sq. cm. so as to obtain compacts having a bulk density of about 4.3 g./cu. cm.

It is also known from the printed German application No. 1,119,886 to pelletize high-grade fine-grained iron ore concentrates and to reduce them in reducing kilns. When the reduced pellets have been discharged from the reducing kiln and have been cooled, they are compacted without a binder to a bulk density of about 4.3 g./cu. cm.

Processes of briquetting iron ore have been disclosed (printed German application No. 1,123,351; "Agglomeration," New York, London, 1962, page 743) in which partly reduced iron oxides, iron ores and iron dusts are compacted without a binder at temperatures between 170 and 850° C. and with applied pressures up to 4,000 kg./sq. cm.

In the briquetting of sponge iron (Metal Progress, April 1958, page 73), which is recovered by a direct reduction of lump iron ore, the extremely porous sponge iron is compacted without a binder by roll presses or roll-and-ring presses to a bulk density of about 4.5 g./cu. cm. under applied pressures of up to 5,400 kg./sq. cm.

It has also been proposed (German Pat. No. 1,071,733) to compact sponge iron in the cold under applied pressures of 35 to 7,000 kg./sq. cm. To obtain sponge iron briquettes having a high bulk density, French Pat. No. 1,432,307 and British patent specification No. 970,423 teach the applying of pressures of 6.3 to 15.8 metric tons per sq. cm.

All these processes have the disadvantage that the bulk density of the resulting compacts is too low so that the compacts cannot penetrate the slag layer on the molten steel bath in the electric melting furnace and thus cannot become submerged in the molten steel.

The compacts obtained have also a relatively low mechanical strength so that a relatively large amount of abraded fines is obtained, which are undesirable for various reasons in the melting process.

A further disadvantage of the known processes resides in that the use of applied pressures above 3,000 kg./sq. cm. involves a considerable wear on the briquette die shape of the briquetting press which is used.

It is an object of this invention to eliminate to a large extent the above-mentioned disadvantages of the known processes. According to this invention, this object is accomplished in that the porous sponge iron is compacted immediately after its discharge from the rotary kiln and the removal of the surplus reducing agent, admixtures, and ash to a bulk density of more than about 5 g./cm.$^3$ in an exactly defined temperature range of 400 to 800° C. and under an applied pressure in an exactly defined range of 1,500 to 3,000 kg./sq. cm.

The sponge iron to be compacted which is charged into the briquetting press has desirably a particle size below 15 mm., preferably a particle size of 3–15 mm.

In a preferred embodiment of this invention, the sponge iron fraction having a particle size below 3 mm. is cooled and subsequently added as a binder to the hot sponge iron. It has been found that this results in an increase in the abrasive and crushing strengths of the briquettes. Sponge iron fractions in that particle size range may be obtained from other processes and used for the purpose stated if the amount of fines below 3 mm. from the process itself is not sufficient.

The sponge iron may be briquetted on stamping presses, roll presses or ring-and-roll presses.

This invention is explained by the way of example in the following embodiments:

EXAMPLE 1

A mixture of iron ore pellets from Hilton-ore, containing 73% of pellets with a diameter of 12 to 15 mm., 25% of pellets with a diameter of 10–12 mm. and 2% of pellets with a diameter of <10 mm. was reduced in a rotary kiln. The reduced sponge iron pellets with a bulk density of 2.425 g./cm.$^3$ and a porosity of 65.1% were discharged from the rotary kiln at a temperature of about 800 to 900° C. The chemical analysis of the pellet was

|  | Percent |
|---|---|
| $Fe_{total}$ | 93.0 |
| $Fe_{met}$ | 90.0 |
| C | 0.3 |
| S | 0.133 |

A part of these pellets was briquetted at a temperature of about 600° C. and another part at a temperature of about 20° C. on a two pillar type stamping press, which briquettes die shape had a diameter of 50 mm.

The pressures applied in the hot and cold briquetting of the sponge iron pellets and the obtained bulk densities of the pellet-briquettes are listed in Table I.

TABLE I

|  | Bulk density (hot briquetting), g./cm.$^3$ | Bulk density (cold briquetting), g./cm.$^3$ |
|---|---|---|
| Pressure applied, kg./cm.$^2$: | | |
| 1,500 | 4.569 | 3.848 |
| 2,000 | 4.925 | 4.190 |
| 2,500 | 5.207 | 4.445 |
| 3,000 | 5.422 | 4.676 |

A comparison of the bulk densities obtained by hot and cold briquetting shows clearly that for a given pressure applied the hot briquetting of sponge iron pellets results in bulk densities which are higher than those which can be obtained by cold briquetting.

The advantage which is obtained by this invention resides particularly in that the selection of the pressure applied and the temperature according to this invention enables a compacting of sponge iron to such a high bulk density that the resulting briquettes can penetrate the slag layer in an electric furnace and become submerged in the molten steel itself.

It is a further advantage of the process of this invention that the pressures applied in the hot briquetting do not result in a wear on the dies of the briquetting press to a larger extent than in known processes of briquetting other raw materials.

Another advantage resides in that the sponge iron briquettes have such a high abrasive strength that there is almost no undesired formation of fines during the frequent handling of the briquettes in transit and storage.

Having now described the means by which the objects of the invention are obtained,

We claim:

1. In the process for making sponge iron briquettes comprising transforming enriched iron ore concentrates consisting of green pellets, prehardened pellets or coarse grained ore lumps, each with or without admixtures, into sponge iron under reducing conditions in a rotary kiln, removing the surplus reducing agent, admixtures and ash from the material discharged from the kiln, and then briquetting the sponge iron, the improvement comprising briquetting the sponge iron immediately after the removal of said reducing agent, admixtures and ash at a temperature ranging from 400 to 800° C. and under a pressure of from 1500 to 3000 kg./cm.$^2$ to form briquettes having a bulk density of more than about 5 g./cm.$^3$.

2. In the process of claim 1, said sponge iron having a particle size ranging from 3 to 15 mm.

3. In the process of claim 2, further comprising separating and cooling the sponge iron fraction having a particle size less than 3 mm., and then adding the separation fraction as a binder in the hot sponge iron.

4. A process as in claim 3, further comprising briquetting said sponge iron on a stamping press.

5. A process as in claim 3, further comprising briquetting said sponge iron on a roll press.

6. A process as in claim 3, further comprising briquetting said sponge iron on a ring-and-roll press.

References Cited

UNITED STATES PATENTS

| Patent No. | Date | Inventor | Class |
|---|---|---|---|
| 2,871,115 | 1/1959 | Agarwal | 75—44X |
| 2,874,037 | 2/1959 | Fisher | 75—34 |
| 2,875,035 | 2/1959 | Graham et al. | 75—34 |
| 2,986,460 | 5/1961 | Babcock et al. | 75—44 |
| 3,185,563 | 5/1965 | Jones et al. | 75—1 |
| 3,278,293 | 10/1966 | Smith | 75—44X |
| 3,295,957 | 1/1967 | Robertson | 75—44X |
| 3,392,008 | 7/1968 | Wald | 75—44X |

FOREIGN PATENTS

| | | | |
|---|---|---|---|
| 974,273 | 11/1964 | Great Britain | 75—44 |

HYLAND BIZOT, Primary Examiner

G. K. WHITE, Assistant Examiner

U.S. Cl. X.R.

75—38, 44